United States Patent
Kim

[19]

[11] Patent Number: 5,966,436
[45] Date of Patent: Oct. 12, 1999

[54] REDIALING METHOD

[75] Inventor: Ik-Hyun Kim, Daegu, Rep. of Korea

[73] Assignee: SamSung Electronics Co., Ltd., Suwon, Rep. of Korea

[21] Appl. No.: 08/575,362

[22] Filed: Dec. 20, 1995

[51] Int. Cl.⁶ .............................. H04M 1/64; H04M 3/42; H04M 3/00; H04M 1/00
[52] U.S. Cl. ................. 379/216; 379/88.03; 379/100.14; 379/256; 379/280; 379/281; 379/341; 379/355; 379/359
[58] Field of Search ................................. 379/67, 88, 89, 379/216, 355, 51, 88.03, 100.14, 209, 237, 256, 280, 281, 288, 341, 359

[56] References Cited

U.S. PATENT DOCUMENTS

| | | | |
|---|---|---|---|
| 4,119,810 | 10/1978 | Marin et al. | 379/40 |
| 4,571,463 | 2/1986 | Shefler | 379/355 |
| 4,769,835 | 9/1988 | Hirth et al. | 379/355 |
| 4,805,212 | 2/1989 | Hase et al. | 379/359 |
| 4,933,968 | 6/1990 | Iggulden | 379/216 |
| 5,136,637 | 8/1992 | Rust et al. | 379/356 |
| 5,243,646 | 9/1993 | McCarthy | 379/356 |
| 5,394,462 | 2/1995 | Maemura | 379/142 |
| 5,425,095 | 6/1995 | Yoshino | 379/355 |

*Primary Examiner*—Fan S. Tsang
*Assistant Examiner*—Allan Hoosain
*Attorney, Agent, or Firm*—Robert E. Bushnell, Esq.

[57] ABSTRACT

A redialing method in a communication apparatus provides that the digits of a telephone number are consecutively input by a user, and the actual time intervals between the consecutive inputs are measured and stored in memory along with the digits of the telephone number. During redialing, the digits of the telephone number and the actual time intervals between the consecutive digits are read from memory, and the telephone number is dialed by inserting the previously measured actual time intervals between the respective digits of the telephone number. According to this method, the redialing operation can be effectively performed in various kinds of information service telephones or key phones, and cumbersome key manipulation can be eliminated.

12 Claims, 3 Drawing Sheets

REDIALING METHOD

BACKGROUND OF THE INVENTION

The present invention relates to a redialing method for a communication apparatus, and more particularly, to a redialing method that redials the digits of a telephone number in accordance with actual time intervals between the respective digits established by a user when originally dialing the telephone number.

Generally, when a telephone number is dialed and then stored in a facsimile or telephone device, if a redial key is later input, the stored telephone number is immediately redialed without regard to how quickly or slowly the telephone number has originally dialed. However, in order to catch a dial tone of a private exchange and/or a national exchange through a key telephone, dialing must be delayed until the dial tones of the respective exchanges are heard. After the dial tones are heard, dialing can be performed. A redialing operation can not be properly performed in this situation without considering the pause times for hearing the dial tones of the respective exchanges.

Moreover, in situations where a user is being provided with various kinds of information over the telephone, a main telephone number is first dialed, and then desired digits are next entered according to the instructions of a voice guide (i.e., menu options) stored in the information system. In these cases, an effective redial operation based on proper time intervals between digit entries would be invaluable for the user since otherwise, many digits must be manually entered and much time is unnecessarily consumed.

One prior art reference that seeks to insert dialing intervals between digits of a telephone number is disclosed in U.S. Pat. No. 4,769,835 entitled Method Of And Cicuit Arrangement For Inserting Dialling Intervals Between Stored Dialling Digits issued to Hirth et al. In Hirth et al. '835, when a user directly inputs digits of a telephone number, time intervals between digit inputs that exceed a normal length can be stored along with the digits. Upon redialing, those time intervals that exceed the normal length are inserted between their corresponding pairs of digits. While this type of configuration provides benefits in its own right, I note that conventional art, such as Hirth et al. '835, fails to store and utilize the time intervals between all pairs of consecutively input digits. That is, Hirth et al. '835 provides that only time intervals that exceed a given length are stored and utilized. Accordingly, I believe that an improved redialing method which advantageously utilizes all dialing intervals established by a user during an original dialing operation can be contemplated.

SUMMARY OF THE INVENTION

Accordingly, it is an object of the present invention to provide an improved redialing method for a communication apparatus.

It is another object to provide a redialing method capable of redialing a telephone number with specified actual time intervals between the respective digits of the telephone number.

It is still another object to provide a redialing method that allows a user to define the actual time intervals observed between respective digits of the telephone number when the telephone number is redialed.

It is yet another object to provide a redialing method that redials the digits of a telephone number in accordance with actual time intervals between the respective digits established by a user when originally dialing the telephone number.

It is still yet another object to provide a redialing method that redials the digits of a telephone number in accordance with actual time intervals between the respective digits established by a user, irrespective of how short or long the time intervals are.

These and other objects can be achieved in accordance with the principles of the present invention with a redialing method wherein the digits of a telephone number are consecutively input by a user, and all of the time intervals between the consecutive inputs, irrespective of duration, are measured and stored in memory with the digits of the telephone number. During redialing, the digits of the telephone number and the actual time intervals between the consecutive digits are read from memory, and the telephone number is dialed by inserting the previously measured actual time intervals between the respective digits of the telephone number.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION OF THE INVENTION

Figure 1:
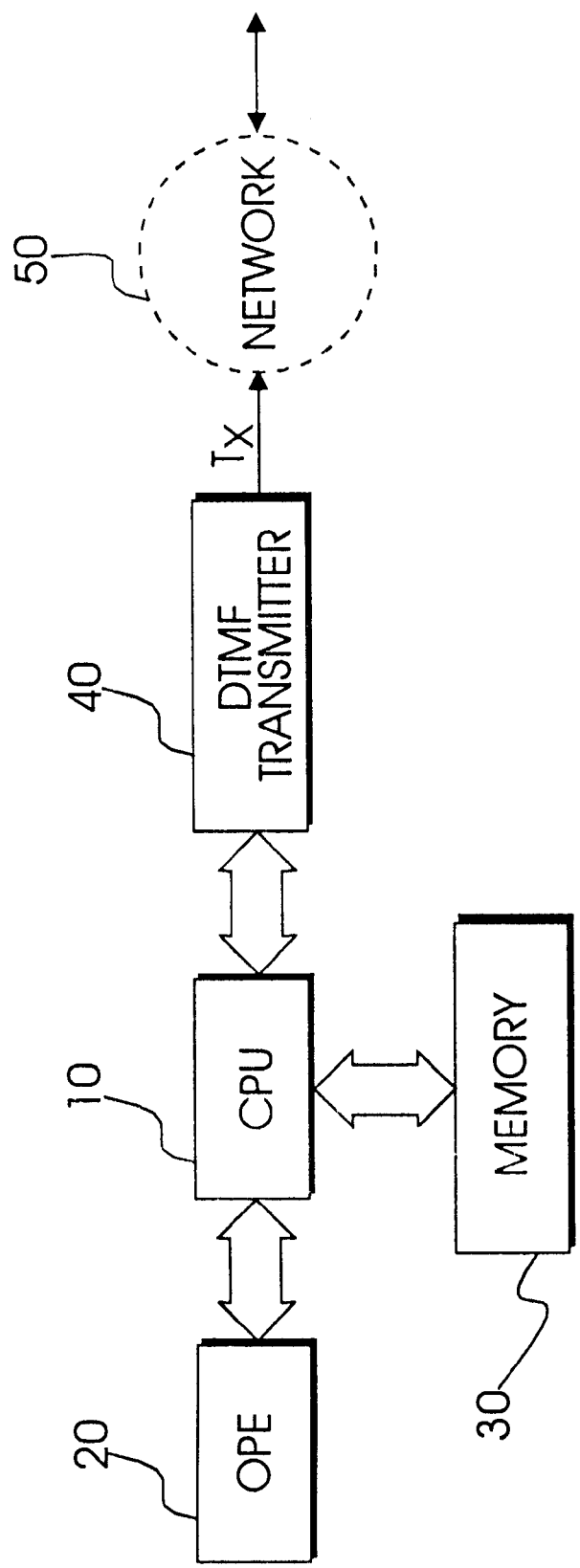
FIG. 1 is a block diagram of a communication system constructed according to the principles of the present invention.

Turning now to the drawings and referring to FIG. 1, a block diagram of a communication system constructed according to the principles of the present invention is shown. In FIG. 1, a central processing unit (CPU) 10 receives key input signals and controls a dialing operation. When a redial key input signal is received after an input telephone number is stored, central processing unit (CPU) 10 enables redialing of the stored telephone number and generates various kinds of display control data. An operating panel (OPE) 20 contains a plurality of keys used for generating the key input signals. When a key on operating panel (OPE) 20 is activated, a corresponding key input signal is provided to central processing unit (CPU) 10. Operating panel (OPE) 20 also includes a display unit for displaying data under the control of central processing unit (CPU) 10. A memory 30 stores protocol data and character data. Memory 30 accesses and stores key input signals representative of an entered telephone number under the control of central processing unit (CPU) 10. A dual tone multi-frequency (DTMF) transmitter 40 receives the entered telephone number from central processing unit (CPU) 10 and performs the dialing operation to place a call over a communications network 50.

Figure 2:
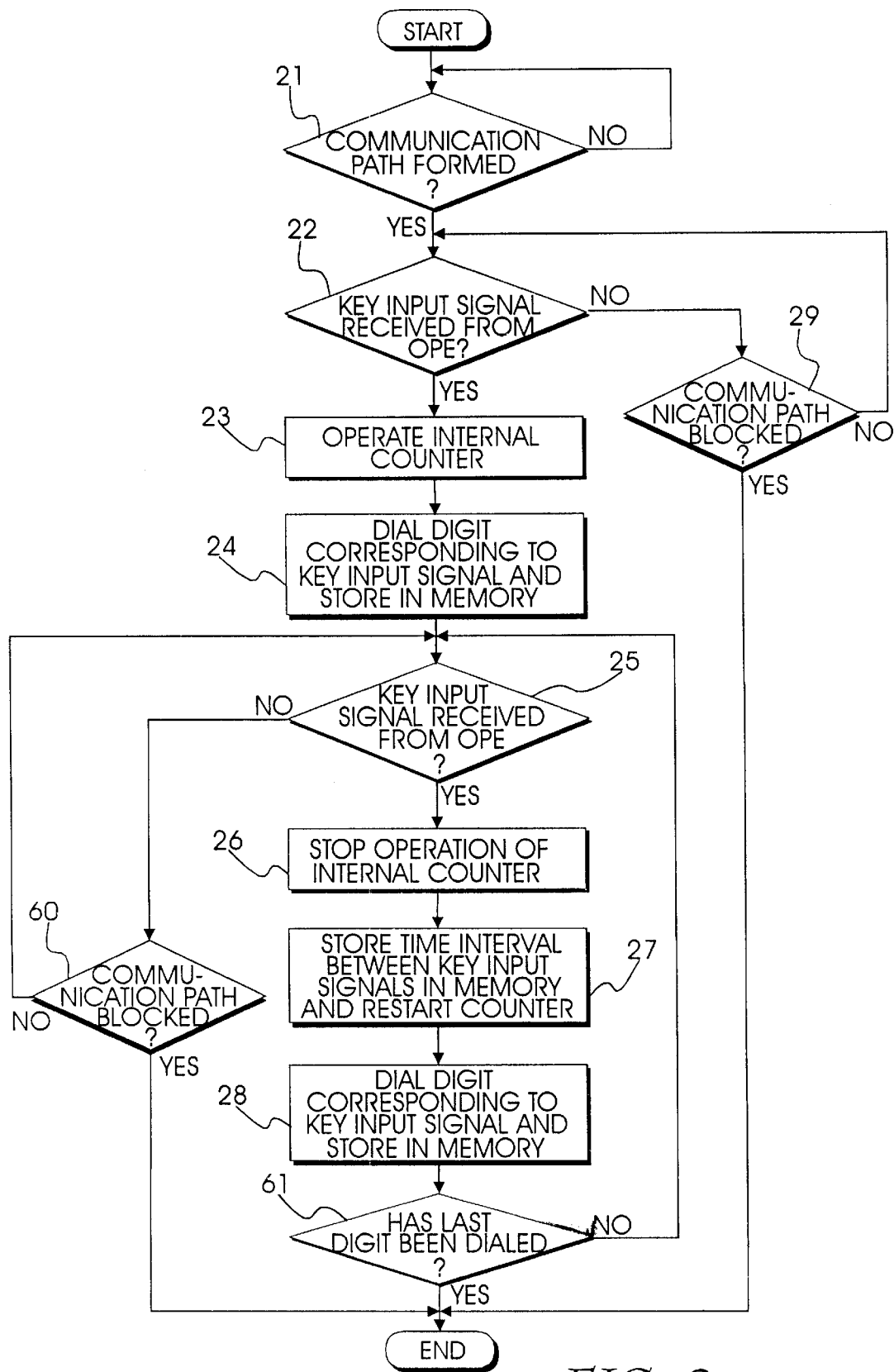
FIG. 2 is a flowchart illustrating the steps for entering a telephone number according to the principles of the present invention.
Figure 3:
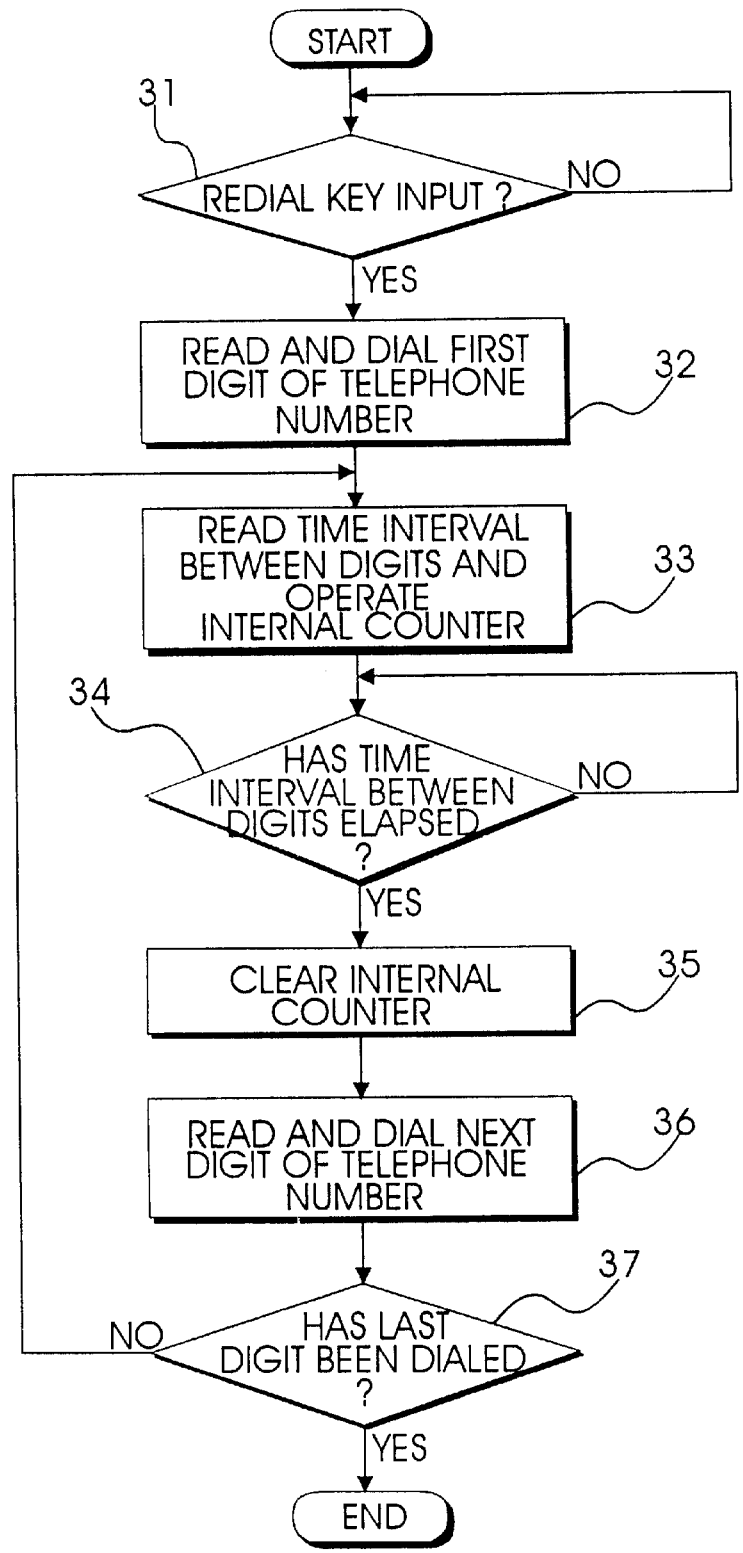
FIG. 3 is a flowchart illustrating the steps for performing a redialing operation according to the principles of the present invention.

FIG. 2 is a flowchart illustrating the steps for entering a telephone number according to the principles of the present invention, and FIG. 3 is a flowchart illustrating the steps for performing a redialing operation according to the principles of the present invention.

A preferred embodiment of the present invention will now be described in detail with reference to FIGS. 1 through 3.

First, the operation of entering a telephone number by providing key inputs will be described with reference to FIG. 2.

In step 21, central processing unit (CPU) 10 determines whether a communication path is formed by detecting when a hook switch (not shown) on a user's telephone represents an off-hook state. After the communication path is formed, central processing unit (CPU) 10 determines whether a key input signal representative of a digit of a telephone number is provided from operating panel (OPE) 20 in step 22. If no key input signal is provided, central processing unit (CPU) 10 determines whether the communication path is blocked in step 29. If the communication path is not blocked in step 29, the process returns to step 22. If the communication path is blocked, the process is terminated. When a key input signal is provided in step 22, central processing unit (CPU) 10 begins operation of an internal counter in step 23. In step 24, central processing unit (CPU) 10 dials the digit corresponding to the key input signal and stores the digit in memory 30. Thereafter, in step 25, central processing unit (CPU) 10 determines whether another key input signal representative of the next digit of the telephone number is provided from operating panel (OPE) 20. If no key input signal is provided, central processing unit (CPU) 10 determines whether the communication path is blocked in step 60. If the communication path is not blocked in step 60, the process returns to step 25. If the communication path is blocked, the process is terminated. When another key input signal is provided in step 25, central processing unit (CPU) 10 stops the operation of the internal counter in step 26. In step 27, central processing unit (CPU) 10 determines the actual time interval between the two consecutive key input signals, stores this actual time interval in memory 30 and restarts the internal counter to begin calculating the actual time interval until the next key input signal is received. In step 28, central processing unit (CPU) 10 dials the digit corresponding to the current key input signal and stores the digit in memory 30. In step 61, when the last digit of the telephone number has been dialed, the process is terminated. When the last digit has not been dialed in step 61, steps 25 through 28 are then repeatedly performed until all digits of the telephone number are dialed. As these steps are repeated, the digits corresponding to the key input signals, and the actual time intervals between consecutive key input signals, regardless of length, are stored in memory 30.

After entering the telephone number into memory 30 through key inputs, the telephone number can be redialed by entering a redial key. The redialing operation performed according to the principles of the present invention will now be described with reference to FIG. 3.

In step 31, central processing unit (CPU) 10 determines whether the redial key is input from operating panel (OPE) 20. When the redial key is input, central processing unit (CPU) 10 reads the first digit of the telephone number from memory 30, and controls dual tone multi-frequency (DTMF) transmitter 40 to dial the first digit of the telephone number, in step 32. In step 33, central processing unit (CPU) 10 reads the actual time interval between input of the current digit and input of the next digit from memory 30 and operates the internal counter. In step 34, central processing unit (CPU) 10 checks the internal counter to determine whether the actual time interval between input of the two consecutive digits has elapsed. If the actual time interval has elapsed, central processing unit (CPU) 10 clears the internal counter in step 35 and proceeds to step 36. In step 36, central processing unit (CPU) 10 reads the next digit of the telephone number from memory 30 and controls dual tone multi-frequency (DTMF) transmitter 40 to dial the next digit of the telephone number. Then, in step 37, central processing unit (CPU) 10 determines whether the last digit of the telephone number has been dialed. If the last digit of the telephone number has not been dialed, the process returns to step 33, and steps 33 through 37 are repeatedly performed until the last digit of the telephone number has been dialed.

An example of the present invention in practice will now be provided below. In this example, a key phone user enters a telephone number according to the steps shown in FIG. 2, in order to place a call through both a private exchange and a national exchange. When the user is unable to complete his call, he can then enable performance of the redialing operation depicted in FIG. 3.

Assume that the key phone user wants to communicate with a party having a telephone number 460-2775. The key phone user first enters the digit "9" from the operating panel (OPE) 20 of the key phone (i.e., to access the private exchange), and the digit "9" is stored in memory 30. A communication path is then formed between the key phone and the private exchange. Thereafter, the user again enters the digit "9" (i.e., to access the national exchange) two seconds after first entry of the digit "9". The key phone stores a time interval of two seconds, and then stores the second digit "9" in memory 30, thereby forming a communication path with the national exchange through the private exchange. Then, three seconds after the second digit "9" is entered, the key phone user sequentially enters the digits "4", "6", "0", "2", "7", "7" and "5", with a one second interval between each of the digits. The key phone stores a time interval of three seconds (i.e., the time interval between entry of the second digit "9" and the third digit "4"), and then stores the third digit "4" in memory 30. Thereafter, a time interval of one second (i.e., the time interval between entry of the third digit "4" and the fourth digit "6"), and then the fourth digit "6" are stored in memory 30. In this manner, the one second time intervals, and digits "0", "2", "7" and "5" are stored in memory 30 as expressed in the following Table 1.

TABLE 1

| 9 | 2s | 9 | 3s | 4 | 1s | 6 | 1s | 0 | 1s | 2 | 1s | 7 | 1s | 7 | 1s | 5 | ... |
|---|----|---|----|---|----|---|----|---|----|---|----|---|----|---|----|---|-----|

After the entered telephone number is stored in memory 30 of the key phone as expressed in Table 1 above, if the redial key is input, the redialing operation is performed as follows.

After the user removes the handset of the key phone from its hook and presses the redial key, the key phone reads the first digit "9" from memory 30 and dials the digit "9". Two seconds later, the key phone reads and dials the second digit "9". After another three seconds, the key phone reads and dials the third digit "4". One second after the third digit "4"

is dialed, the key phone reads and dials the digit "6". In this manner, the digits "2", "7", "7" and "5" are read and dialed with a one second gap between each digit.

Although the example of the present invention presented above involves placing a call through a private exchange and a national exchange using a key phone, the redialing method according to the present invention can also executed in a multi-functional or specific service telephone or facsimile.

As described above, the present invention provides that the actual time intervals between entries of the respective digits of a telephone number are maintained when performing a redialing operation. Therefore, since the redialing operation is performed in various kinds of information service telephones or key phones, cumbersome key manipulation can be simplified.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. A redialing method in a communication apparatus wherein digits of a telephone number are sequentially input by a user and an actual time interval between input of each pair of consecutive digits is measured and stored in memory with said digits, said telephone number being redialed in response to input of a redial key by reading said digits and each said time interval from said memory, and dialing said digits with each said a time interval respectively inserted between each said actual pair of consecutive digits.

2. The redialing method as claimed in claim 1, further comprised of each of said actual time intervals having no maximum or minimum length.

3. A redialing method in a communication apparatus, comprising the steps of:

entering a telephone number by providing sequential user inputs of digits of said telephone number, measuring an actual time interval between input of each pair of consecutive digits, and storing said digits and each said actual time interval; and dialing, in response to input of a redial key, said digits of said telephone number with each said actual time interval respectively interposed between each said pair of consecutive digits.

4. The redialing method as claimed in claim 3, wherein said entering step further comprises the substeps of:

operating an internal counter in response to input of a first digit, storing said first digit, stopping operation of said internal counter in response to input of a second digit, storing said second digit and a first time interval counted by said internal counter between the input of said first digit and the input of said second digit and restarting said internal counter, stopping operation of said internal counter in response to input of a third digit, storing said third digit and a second time interval counted by said internal counter between the input of said second digit and the input of said third digit and restarting said internal counter, stopping operation of said internal counter in response to input of a fourth digit, storing said fourth digit and a third time interval counted by said internal counter between the input of said third digit and the input of said fourth digit and restarting said internal counter, stopping operation of said internal counter in response to input of a fifth digit, storing said fifth digit and a fourth time interval counted by said internal counter between the input of said fourth digit and the input of said fifth digit and restarting said internal counter, stopping operation of said internal counter in response to input of a sixth digit, storing said sixth digit and a fifth time interval counted by said internal counter between the input of said fifth digit and the input of said sixth digit and restarting said internal counter, stopping operation of said internal counter in response to input of a seventh digit, storing said seventh digit and a sixth time interval counted by said internal counter between the input of said sixth digit and the input of said seventh digit and restarting said internal counter, stopping operation of said internal counter in response to input of a seventh digit, storing said seventh digit and a sixth time interval counted by said internal counter between the input of said sixth digit and the input of said seventh digit and restarting said internal counter, stopping operation of said internal counter in response to input of an eighth digit, storing said eighth digit and a seventh time interval counted by said internal counter between the input of said seventh digit and the input of said eighth digit and restarting said internal counter, stopping operation of said internal counter in response to input of a ninth digit, and storing said ninth digit and an eighth time interval counted by said internal counter between the input of said eighth digit and the input of said ninth digit.

5. The redialing method as claimed in claim 4, wherein said dialing step further comprises the substeps of:

reading and dialing said first digit in response to the input of said redial key, reading and dialing said second digit said first time interval after dialing said first digit, reading and dialing said third digit said second time interval after dialing said second digit, reading and dialing said fourth digit said third time interval after dialing said third digit, reading and dialing said fifth digit said fourth time interval after dialing said fourth digit, reading and dialing said sixth digit said fifth time interval after dialing said fifth digit, reading and dialing said seventh digit said sixth time interval after dialing said sixth digit, reading and dialing said eighth digit said seventh time interval after dialing said seventh digit, and reading and dialing said ninth digit said eighth time interval after dialing said eighth digit.

6. The redialing method as claimed in claim 3, further comprised of each of said actual time intervals having no maximum or minimum length.

7. A communication apparatus for performing a redial operation, comprising:

first means for providing sequential user inputs of digits of a telephone number and second means for measuring an actual time interval between input of each pair of consecutive digits and storing said digits and each said actual time interval, said second means enabling performance of said redial operation in response to a redial input provided from said first means by dialing said digits of said telephone number with each said actual time interval respectively interposed between each said pair of consecutive digits.

8. The communication apparatus as claimed in claim 7, further comprised of said second means operating an internal counter in response to input of a first digit from said first means, storing said first digit, stopping operation of said internal counter in response to input of a second digit from said first means, storing said second digit and a first time interval counted by said internal counter between the input of said first digit and the input of said second digit and restarting said internal counter, stopping operation of said internal counter in response to input of a third digit from said first means, storing said third digit and a second time interval counted by said internal counter between the input of said second digit and the input of said third digit and restarting said internal counter, stopping operation of said internal counter in response to input of a fourth digit from said first means, storing said fourth digit and a third time interval counted by said internal counter between the input of said third digit and the input of said fourth digit and restarting said internal counter, stopping operation of said internal counter in response to input of a fifth digit from said first means, storing said fifth digit and a fourth time interval counted by said internal counter between the input of said fourth digit and the input of said fifth digit and restarting said internal counter, stopping operation of said internal counter in response to input of a sixth digit from said first means, storing said sixth digit and a fifth time interval counted by said internal counter between the input of said fifth digit and the input of said sixth digit and restarting said internal counter, stopping operation of said internal counter in response to input of a seventh digit from said first means, storing said seventh digit and a sixth time interval counted by said internal counter between the input of said sixth digit and the input of said seventh digit and restarting said internal counter, stopping operation of said internal counter in response to input of a seventh digit from said first means, storing said seventh digit and a sixth time interval counted by said internal counter between the input of said sixth digit and the input of said seventh digit and restarting said internal counter, stopping operation of said internal counter in response to input of an eighth digit from said first means, storing said interval digit and a seventh time interval counted by said internal counter between the input of said seventh digit and the input of said eighth digit and restarting said internal counter, stopping operation of said internal counter in response to input of a ninth digit from said first means, and storing said ninth digit and an eighth time interval counted by said internal counter between the input of said eighth digit and the input of said ninth digit.

9. The communication apparatus as claimed in claim 8, further comprised of said second means reading and dialing said first digit in response to said redial input provided from said first means, reading and dialing said second digit said first time interval after dialing said first digit, reading and dialing said third digit said second time interval after dialing said second digit, reading and dialing said fourth digit said third time interval after dialing said third digit, reading and dialing said fifth digit said fourth time interval after dialing said fourth digit, reading and dialing said sixth digit said fifth time interval after dialing said fifth digit, reading and dialing said seventh digit said sixth time interval after dialing said sixth digit, reading and dialing said eighth digit said seventh time interval after dialing said seventh digit, and reading and dialing said ninth digit said eighth time interval after dialing said eighth digit.

10. The communication apparatus as claimed in claim 7, further comprised of each of said actual time intervals having no maximum or minimum length.

11. A communication apparatus, comprising:
    first means for providing sequential user inputs of digits of a telephone number; and
    second means for operating an internal counter in response to input of a first digit from said first means, storing said first digit, stopping operation of said internal counter in response to input of a second digit from said first means, storing said second digit and a first actual time interval counted by said internal counter between the input of said first digit and the input of said second digit and restarting said internal counter, stopping operation of said internal counter in response to input of a third digit from said first means, storing said third digit and a second actual time interval counted by said internal counter between the input of said second digit and the input of said third digit and restarting said internal counter, stopping operation of said internal counter in response to input of a fourth digit from said first means, storing said fourth digit and a third actual time interval counted by said internal counter between the input of said third and the input of said fourth digit and restarting said internal counter, stopping operation of said internal counter in response to input of a fifth digit from said first means, storing said fifth digit and a fourth actual time interval counted by said internal counter between the input of said fourth digit and the input of said fifth digit and restarting said internal counter, stopping operation of said internal counter in response to input of a sixth digit from said first means, storing said sixth digit and a fifth actual time interval counted by said internal counter between the input of said fifth digit and the input of said sixth digit and restarting said internal counter, stopping operation of said internal counter in response to input of a seventh digit from said first means, storing said seventh digit and a sixth actual time interval counted by said internal counter between the input of said sixth digit and the input of said seventh digit and restarting said internal counter, stopping operation of said internal counter in response to input of an eighth digit from said first means, storing said eighth digit and a seventh actual time interval counted by said internal counter between the input of said seventh digit and the input of said eighth digit and restarting said internal counter, stopping operation of said internal counter in response to input of a ninth digit from said first means, and storing said ninth digit and an eighth actual time interval counted by said internal counter between the input of said eighth digit and the input of said ninth digit.

12. The communication apparatus as claimed in claim 11, further comprised of said first, second, third, fourth, fifth, sixth, seventh and eighth actual time intervals having no maximum or minimum duration.

* * * * *